(12) United States Patent
Gurnani et al.

(10) Patent No.: US 6,947,723 B1
(45) Date of Patent: Sep. 20, 2005

(54) POSTPAY SPENDING LIMIT USING A CELLULAR NETWORK USAGE GOVERNOR

(75) Inventors: Roger Gurnani, Basking Ridge, NJ (US); Kevin Patrick Meehan, Yardley, PA (US); Christopher James Shunk, Easton, PA (US); Robert Samuel Crouch, Bellevue, WA (US)

(73) Assignee: Cellco Partnership, Bedminster, NJ (US)

( * ) Notice: Subject to any disclaimer, the term of this patent is extended or adjusted under 35 U.S.C. 154(b) by 145 days.

(21) Appl. No.: 10/322,533

(22) Filed: Dec. 19, 2002

Related U.S. Application Data

(60) Provisional application No. 60/347,239, filed on Jan. 14, 2002.

(51) Int. Cl.[7] .................... H04M 11/00; H04M 15/00
(52) U.S. Cl. ............. 455/406; 455/408; 379/114.01; 379/114.09; 379/114.17; 379/121.02
(58) Field of Search ............... 455/405–408; 379/111, 114.01, 114.03, 114.15, 114.16, 379/114.17, 114.19, 121.02, 121.04, 144.01, 379/144.05, 114.09

(56) References Cited

U.S. PATENT DOCUMENTS

| | | | | |
|---|---|---|---|---|
| 5,359,182 A | | 10/1994 | Schilling ................... 235/380 |
| 5,450,477 A | * | 9/1995 | Amarant et al. ........ 379/114.17 |
| 5,517,555 A | * | 5/1996 | Amadon et al. ............ 455/408 |
| 5,615,408 A | * | 3/1997 | Johnson et al. ............ 455/405 |
| 5,684,861 A | * | 11/1997 | Lewis et al. ................ 455/405 |
| 5,749,052 A | * | 5/1998 | Hidem et al. ............... 455/406 |
| 5,826,185 A | | 10/1998 | Wise et al. ................. 455/405 |
| 5,963,625 A | * | 10/1999 | Kawecki et al. ....... 379/127.01 |
| 5,987,108 A | * | 11/1999 | Jagadish et al. ........ 379/114.01 |
| 6,029,062 A | | 2/2000 | Hanson ...................... 455/408 |
| 6,036,090 A | | 3/2000 | Rahman et al. ............ 235/380 |
| 6,058,300 A | | 5/2000 | Hanson ...................... 455/406 |
| 6,131,024 A | | 10/2000 | Boltz ......................... 455/405 |
| 6,185,414 B1 | | 2/2001 | Brunner et al. ............ 455/406 |
| 6,445,911 B1 | * | 9/2002 | Chow et al. ................ 455/406 |
| 6,470,179 B1 | * | 10/2002 | Chow et al. ................ 455/406 |
| 6,480,591 B1 | * | 11/2002 | Penfield et al. ........ 379/144.01 |
| 6,546,253 B1 | * | 4/2003 | Chow et al. ................ 455/439 |
| 6,577,857 B1 | * | 6/2003 | Rodriguez .................. 455/405 |
| 6,587,877 B1 | * | 7/2003 | Douglis et al. ............. 709/224 |
| 6,735,290 B1 | * | 5/2004 | Rauba .................... 379/114.16 |
| 6,813,497 B2 | * | 11/2004 | Hutcheson et al. ......... 455/453 |

* cited by examiner

Primary Examiner—Binh K. Tieu
(74) Attorney, Agent, or Firm—McDermott Will & Emery LLP

(57) ABSTRACT

The usage limited postpay service, for mobile wireless communication customers, utilizes a governor platform that estimates all appropriate usage charges and applies those charges in substantially real-time against a pre-set spending cap or limit for each customer. When the customer reaches the limit based on estimated charges, further usage is prohibited, even if the customer reaches the limit during an ongoing call or communication session. The actual bill for service, however, is generated in the normal manner after calls made or received during each billing cycle of the postpay service. The customer may deposit money or make payments against billed amounts, to reset the limit in the database associated with the governor platform. Use of the postpay billing approach allows the carrier to offer the cap or limit on essentially any of the carrier's normal postpay service plans, for example, including any or all of the carriers one-rate service plans.

11 Claims, 2 Drawing Sheets

POSTPAY SPENDING LIMIT USING A CELLULAR NETWORK USAGE GOVERNOR

RELATED APPLICATIONS

This application claims the benefit of U.S. Provisional Application No. 60/347,239 entitled "POSTPAY SPENDING LIMIT USING A CELLULAR NETWORK USAGE GOVERNOR" filed Jan. 14, 2002, the disclosure of which is entirely incorporated herein by reference.

FIELD OF INVENTION

The present subject matter relates to a real-time governor or a technique for limiting postpay billing type customer usage of mobile wireless communication services, such as cellular service, personal communication service (PCS) or related messaging and data services.

BACKGROUND

Modern society offers people many opportunities and in fact places many demands on people to communicate with each other, often over great distances. One of the most common forms of communication involves conversational speech communicated between two or more parties through a telephone network. Modern society also is becoming increasingly mobile. Many new communications services have emerged, to allow people to communicate freely as they roam, without the need for a fixed network connection. These mobile wireless communication services support traditional voice telephone type two-way communications as well as an increasingly diverse array of data services.

In the United States, the customary billing practice for wireless services has been for the carrier providing the wireless service to bill the subscriber on a monthly basis. Typically, the wireless carrier charges a monthly subscription fee plus per-minute fees for telephone communications over-the-air to and from each subscriber's cellular telephone. The monthly subscription fee may include a specified number of minutes of usage time, in which case, the carrier adds charges for minutes over the subscription allotment. A wireless subscriber pays for any such air-time charges, both on outgoing calls and on incoming calls directed to the subscriber's cellular or PCS telephone.

Hence, in a normal mobile telephone type service, call charges are billed to the subscriber associated with the wireless station after disconnection at the end of the call. Such billing after the call is termed "postpay." If the calling station is a mobile station, the postpay billing charges include air-time charges and may include long distance charges if applicable. If the called station is a mobile station, the subscriber associated with that station would receive a bill including charges for the air-time for participation in the call. If a mobile station is roaming (operating outside its assigned home access territory), in either situation, the postpay bill sent to the subscriber would include roaming charges added-on to compensate the carrier operating the network in the visited territory. Similar postpay billing techniques are being used for newer message or data services, although in some cases, the time units for billing have been replaced with various types of message or packet units.

On a monthly basis, the wireless service provider's automated billing system accumulates and processes billing records to determine a postpay subscriber's billable activity and generate the bill. The billing system generates a paper invoice, which is mailed to the subscriber for payment, although there have been recent efforts to implement electronic billing and payment schemes. Extensive use of mobile wireless services can run-up considerable unit-based usage charges in a relatively short period of time. A subscriber may be unwilling or unable to promptly pay an unexpectedly high monthly bill. This situation is problematic both for subscribers who are disconcerted by the surprisingly high monthly bill and to carriers who have difficulty collecting fees under many such circumstances.

Wireless carriers have tried a number of alternative billing techniques in an effort to address problems with the traditional postpay billing technique. For example, many wireless service providers now offer one or more prepay billing type service plans. A prepaid wireless service requires the calling subscriber to deposit a certain amount of funds into an account, in advance. As the caller uses the wireless service, usage charges are deducted from the account balance. As long as there are funds remaining in the account, the subscriber may continue to use the wireless service.

For example, U.S. Pat. No. 6,058,300 to Hanson discloses a prepay telecommunications system utilizing a prepay call management platform coupled to a telecommunications carrier switch. The prepay call management platform has access to a customer database, which stores prepay customer data. A prepay call is recognized by the mobile identification number of the calling wireless terminal device, and the network routes the call to the prepay call management platform. The platform looks-up the customer account balance associated with the calling device in the customer database and calculates the maximum allowable call duration based on the expected call costs per minute and the customer account balance. The prepay call is then released to the telecommunications carrier switch for completion to the station of the called party. At the same time, the platform starts a call duration timer set to the calculated maximum allowable call duration. The call is disconnected in response to the call duration timer reaching the maximum allowable duration.

Other Examples of techniques for implementing prepaid service for mobile wireless communication customers are disclosed, for example, in U.S. Pat. No. 6,185,414 to Brunner et al.; U.S. Pat. No. 6,036,090 to Rahman et al., U.S. Pat. No. 6,029,062 to Hanson; U.S. Pat. No. 5,826,185 to Wise et al.; and U.S. Pat. No. 5,359,182 to Schilling.

Many subscribers are reluctant to move to such a prepay type billing plan for their mobile services. The existing prepay systems have required the subscriber/customer to deposit money in advance. If the customer is unwilling to deposit a substantial sum, then the prepaid service is limited by the very small amount actually deposited. While this limits the exposure of the carrier to bad debt, it may not provide the customer with sufficient service to meet their needs. For these and other reasons, many customers prefer to remain with a postpay type option.

Also, postpay service plans often include a wider array of attractive pricing plans. For example, many service providers offer one-rate plans covering wide geographic areas. Depending on the one monthly rate, the subscriber obtains some relatively large number of minutes for usage throughout the chosen geographic area. The covered usage includes all air-time and long distance for calls to and from points within the chosen geographic area, and within that area, there are no roaming charges. Even for usage over the monthly contract number of minutes, only fixed per minute charges apply within the chosen geographic area. At present, prepaid customers are excluded from one-rate services and many other desirable pricing plans developed for postpay customers.

To provide postpay yet mitigate the impact of overusage during a given billing cycle, some of the wireless carriers have made efforts to develop technologies supporting postpay billing plans that incorporate a usage limit. Each of these limited postpay products was centered around the ability to rapidly collect and apply cellular billing records (Call Detail Records—CDR's, Automatic Message Accounting records—AMA) to the customer's billing account in near real-time.

All such approaches have three major disadvantages. First, cellular switches were not always able to provide timely delivery of the AMA records during heavy phone usage periods, resulting in latencies as long as several hours during which customers might run-up unexpected negative balances. Second, the measurement of the call event using this method depended on detecting the end of the call in order to generate the AMA record, allowing a customer to incur a negative balance as a result of an ongoing call before the system could detect that the customer had exceeded his or her spending limit. Third, customer roaming activity could not be measured and included in real-time, because the Cellular Intercarrier Billing Exchange Roamer Record™ (CIBER Record™) information used to bill cellular roaming activity on other carrier networks would arrive up to 30–60 days after the call was made. All three of these problems resulted in increased financial exposure, resulting in increased bad debt to the wireless service provider, despite the efforts to limit or cap the balance on the postpay account. The roaming issue could be resolved by limiting the customers to local calling areas only, but such a limited service may not be acceptable to many customers.

Hence a need exists for an enhanced technique for providing spending limits on postpay billed services provided to customers by carriers operating mobile wireless communication networks. Such an enhanced solution should address the above-stated needs and overcome the noted deficiencies with prior postpay limiting techniques. For example, such a technique should utilize virtually instantaneous information about forms of usage to allow accurate application of the limit in real-time. Such real-time limiting of usage should take into account any and all charges that may apply to each individual customer's service, including by way of example: air-time charges, long distance charges and roaming charges. Also, the limited postpay solution should be readily adaptable to virtually any postpay pricing plan, such as various one-rate services.

SUMMARY

The inventive concepts alleviate the above noted problems with limiting service in the context of a postpay billing plan, for mobile wireless communication subscribers. The inventive techniques allow a wireless service provider to offer a spending limit pricing product for postpay customers, by limiting the spending through the use of a real-time governor similar to the real-time rating systems used on pre-paid type services. Instead of offering a limited prepay plan, however, the carrier offers any or all of its normal postpay pricing plans with a spending limit option.

In the embodiments, the customer's account is allocated a maximum limit for each billing cycle, which serves as the starting point for debiting in response to usage. However, the customer need not deposit specific amounts of money, in advance. The customer's usage is estimated in real-time by a usage governor platform. The customer's account limit is depleted in real-time in response to the estimated usage charges. The customer's bill, however, is calculated through the postpay billing system(s). As the customer makes bill payments, the payments are also added to raise the account limit, allowing the customer to continue usage of their service. If the customer's usage reaches their spending limit (preset amount debited until it goes to zero), then an ongoing call (if any) is terminated mid-call and the customer will not be able to use their mobile wireless service again until a payment is made on their account. The customer receives a bill for actual usage at the end of the billing cycle, in essentially the normal manner. However, because of the use of the governor the bill for each cycle will be near or below the value of the limit, based on actual usage during the cycle.

The full limit is restored upon payment in full on the new postpay bill. The system also can set partially restored limits in response to interim payments or partial payments.

Since the customer does not deposit money in advance, the limited postpay type service does not discourage participation in the same manner as typical prepaid plans. However, this approach does limit the customer's and the carrier's financial exposure, during any given billing cycle, to the amount of the customer established limit. Also, since the carrier processes the usage data through its normal billing systems, the carrier may apply any of its normal postpay pricing plans, for example, any of the one-rate plans offered by the carrier.

Aspects of invention relate to methods of limiting accumulation of billing charges associated with a subscriber's postpay service plan, for a service provided by a wireless communication network. The methods may apply to telephone call-type services or to data sessions or other services offered through the wireless network. Other aspects relate to a network and to systems for implementing the limited postpay service.

Additional objects, advantages and novel features of the embodiments will be set forth in part in the description which follows, and in part will become apparent to those skilled in the art upon examination of the following and the accompanying drawings or may be learned by practice of the invention. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE EMBODIMENTS

The various embodiments disclosed herein relate to systems and techniques for implementing a usage limited postpay service, for one or more mobile wireless communication subscribers. The inventive embodiments utilize a governor platform that estimates all appropriate usage charges and applies those charges on a substantially real-time basis against a pre-set spending cap or limit. When the subscriber reaches the limit based on estimated charges, further usage is prohibited, even if the subscriber reaches the limit during an ongoing call or communication session. The actual bill for service, however, is generated in the normal manner after calls made or received during each billing cycle of the postpay service. The subscriber may deposit money or make payments against billed amounts, to reset the limit in the database associated with the governor platform.

Figure 1:
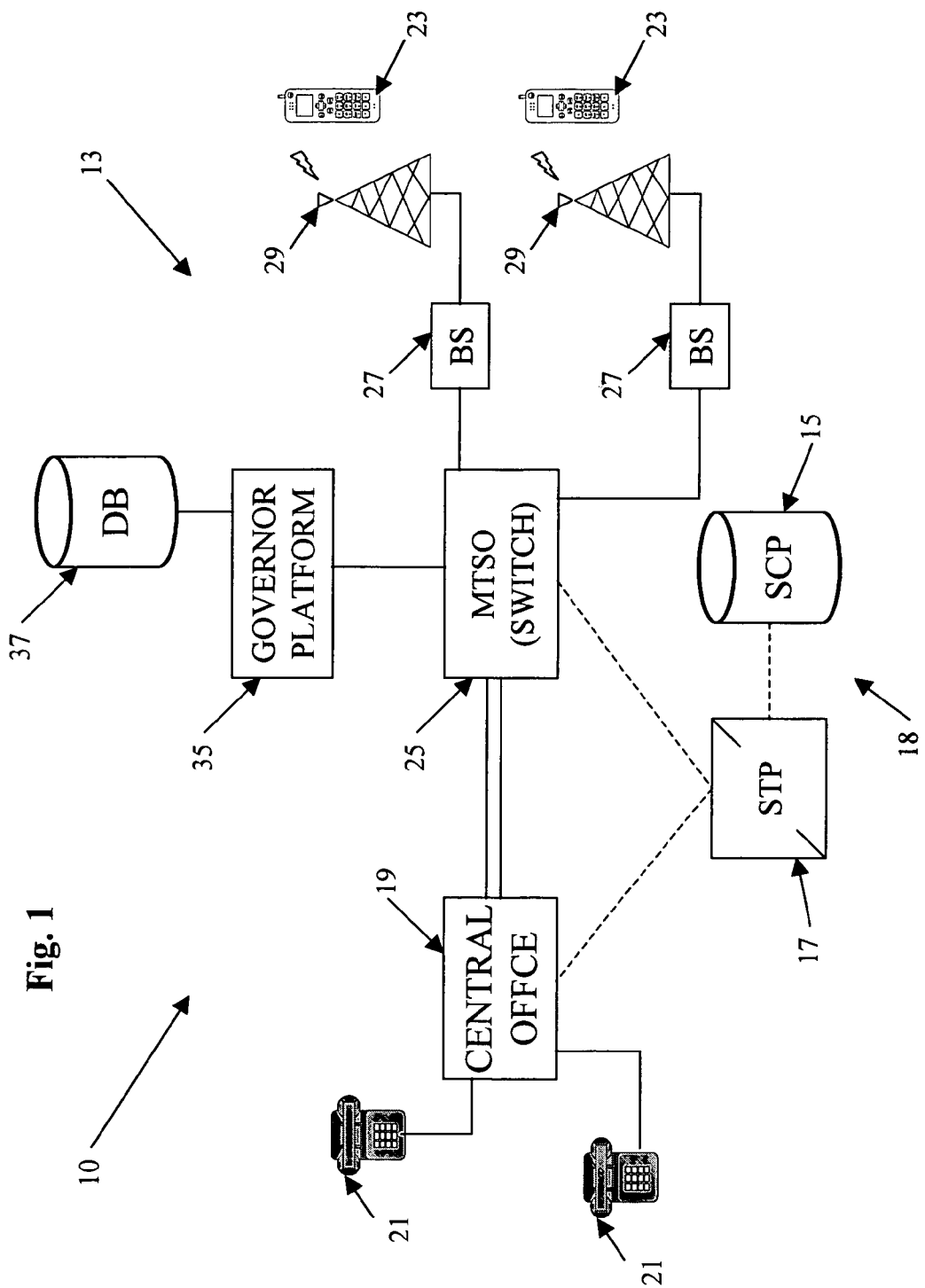
FIG. 1 a simplified block diagram of a telecommunications network providing a limited postpay service for mobile wireless communication customers.

Reference now is made in detail to the presently preferred embodiments, examples of which are illustrated in the accompanying drawings and discussed below. FIG. 1 is a simplified network diagram. The exemplary telecommunications network 10 preferably uses an Advanced Intelligent Network (AIN) architecture. As shown, the overall network 10 includes elements of both a landline network 11 and a mobile wireless network 13. The AIN type telecommunications network 10 also includes a service control point (SCP) 15 coupled to a signal transfer point (STP) 17 through a signaling system no. 7 (SS7) link set. Although only one is shown for convenience, STPs typically are implemented in mated pairs and interconnect to other pairs of STPs. The STPs and the links thereto provide a signaling network 18, for use in managing call traffic through the telecommunications network 10.

The portion of the network 10 that carries customer traffic includes central offices 19 of the landline network, although only one office 19 appears in the drawing, for convenience. The central office 19 may be a service switching point (SSP) connected to the signaling network via SS7 link sets. The central offices 19 connect landline telephone service customers 21 to the telecommunications network 10, in this case, for purposes of making calls to or receiving calls from stations of mobile wireless service subscribers. Although shown as telephone devices, obviously the stations 21 may be any type of device capable of communication via a telephone network. The MTSO 25 may also provide data links to one or more intranets or the Internet (not shown), for data communication sessions.

As noted, the telecommunications network 10 also includes a mobile wireless communication system 13, such as a cellular telephone or PCS system. The wireless system 13 may use any of the known digital and analog technologies for providing voice and/or data services. Those skilled in the art will recognize that the landline and wireless networks may take different forms and provide a vast array of different types of communication services.

In the illustrated implementation, the mobile wireless communication system 13 is further coupled to STP 17 for signaling communication via an SS7 link set. The system 13 also is coupled to one or more central offices 19 of the landline network, via trunk circuits. This arrangement enables the system 13 to provide wireless telecommunications services to and from stations 23 of wireless service customers. For example, to provide cellular telephone type services, the wireless system 13 includes a wireless or cellular switch in a mobile telecommunications switching office (MTSO) 25. Although only one is shown, most systems will include a number of MTSOs or equivalent wireless network switching systems. Each MTSO 25 and the associated base stations (BSs) 27 and cell-site antennas 29 provide mobile wireless services in a local operating territory, forming part of the service area of the mobile service carrier.

For mobile subscribers, the telecommunication network 10 processes calls between wireless customer stations 23 as well as calls between landline stations 21 and the mobile stations 23. Any given mobile station 23 may originate a call or receive a call. Typically the calls are voice or voice-like calls, however, it is envisaged that the communications services may also encompass packet switched data sessions. For ease of discussion, the description herein concentrates on examples of processing a telephone call type service.

In accord with the present teachings, the telecommunication network 10 also includes a usage governor platform 35 coupled to the switch in the MTSO 25. The presently preferred platform 35 is a computerized system interfaced to the switch in the MTSO, having certain call handling, monitoring and rating capabilities, as described below. Alternatively, the usage governor platform 35 may be coupled to or implemented as an application within the MTSO 25 or within the SCP 15. Alternative embodiments may also implement the function of the SCP and/or a usage governor application on an intelligent implementation of the STP 17.

In the presently preferred implementation, the postpay limit processing utilizes AIN processing in accord with the standard TIA ISA826. Appropriate triggers are set in the MTSO 25 to query the SCP 15 and route all incoming and outgoing calls for the subscribers of the spending limit service to the usage governor platform 35. The implementation may utilize a Lucent SurePay™ system as the usage governor platform 35. The usage governor platform 35 implements or has access to a database 37 of data records for wireless customers that subscribe to the limited postpay service.

Using information from customer records in the database 37, the usage governor platform 35 rates and limits all local and roaming calls for the service subscribers in real-time, eliminating the delivery latency issues associated with using AMA or CIBER records. The platform 35 also provides "mid-call teardown", which will terminate a call as soon as the balance reaches the spending limit.

More specifically, when it receives a call, the usage governor platform 35 accesses a record in the database 37 associated with a particular mobile station 23 involved in a call that is to be set-up. The platform obtains the remaining maximum limit balance for the account of the subscriber associated with that particular station 23. The usage governor platform 35 processes data regarding the currently requested call, such as data regarding the other party's station 21 or 23 and the current point of operation of the customer's station 23 within the wireless system 13, to estimate all per unit usage charges that should apply to the call. These per unit charges include air-time, and they may include roaming and/or long distance charges. The platform 35 may access other systems to obtain data necessary to complete its estimate calculation, for example long distance rate tables.

Based on the calculated charge estimates, the usage governor platform 35 determines if there is sufficient money left under the balance of the customer's limit to allow for an initial usage interval. If so, then the usage governor platform 35 calculates a maximum duration for the particular call, at which the remaining limit balance would be completely or at least substantially expended. The usage governor platform 35 then instructs the switch in the MTSO 25 to complete the call and starts a timer. When the switch completes the call to the station 23 or from the station 23 to a called destination 21 (or another mobile station 23), the MTSO 25 makes a normal entry for postpay billing purposes, for example an initial AMA record.

During the ongoing call, the usage governor platform 35 monitors the timer. If the call reaches the calculated maximum duration, the usage governor platform 35 instructs the switch in the MTSO 24 to interrupt the call. If the call terminates before expiration of the calculated maximum duration, the usage governor platform 35 receives notice from the MTSO 24. In response, the platform 35 estimates the total of all time-based usage charges for the completed call. The usage governor platform 35 deducts the total for those charges from the remaining maximum limit balance for the account of the subscriber and updates the subscriber's record in the database 37 with the resultant new maximum limit balance. If the new balance is zero or less than some arbitrary minimum, the usage governor platform 35 may prohibit further calls for the mobile subscriber until the subscriber makes a further payment. In either case, the MTSO 25 makes a normal end-of-call record for billing purposes, for example on its AMA journal.

As shown by this discussion, the usage governor platform 35 monitors and controls each call in real-time, based on estimates of actual usage charges. However, that platform is not involved in actual payment, and the service does not necessarily require prepayments by the subscribers. The customer's bill is subsequently calculated through the postpay billing system(s) from the records generated by the MTSO 25 and any other network elements involved in generating call billing records (e.g. for long distance or roaming charges), in the same manner as for other postpay customers. The postpay bill processing may apply any service plan offered by the carrier. As the customer makes bill payments, the payments are also added to reset or bump up the usage limit value in the account record stored in database 37, allowing the customer to continue usage of their service.

During any billing cycle, the customer's account is allocated a maximum limit, which serves as the starting point for debiting in response to usage. If the customer's account is up to date, the limit will be the agreed maximum. However, if any or all of the previous billed amount remains unpaid, the maximum is effectively decreased by the unpaid amount.

In this method, the customer's usage is estimated in real-time by the governor platform. The customer's account limit is depleted in real-time in response to the estimated usage. If the customer's usage reaches their spending limit (preset amount debited until it goes to zero), then any ongoing call is terminated mid-call and the customer will not be able to use their mobile wireless service again until a payment is made on their account.

This spending limit for the postpay service is provisioned on the usage governor database 37, with the same rates and usage footprint as defined for the postpay billing plan. The customer is given a spending limit balance in the usage governor. The customer is provisioned on the cellular switch in the MTSO 25 so that the switch will communicate with the usage governor platform 35 when the customer uses their cellular service. As the customer uses their service, the usage governor platform 35 decrements their account balance as recorded in the usage governor database 37. However, as the customer pays their monthly bill, their payment is also transmitted to the usage governor database 37, thereby increasing their account balance. If a customer attempts to use more cellular service than provided for in their spending limit, their service is temporarily disabled by the usage governor platform 35 until they make a payment on their account. A customer who uses their service according to the spending limit but fails to make a payment will also be temporarily disabled by the usage governor until they make a payment on their account. In this manner, the governor limits the amount that the customer can run-up the bill during any billing cycle and limits the carrier's exposure to bad debt.

By using a real-time rating system as a usage governor, spending limit type customers are treated like other postpay customer yet can not run-up undue charges. Such customers are sold the same postpay products, qualify for the same postpay pricing, and are billed and serviced using the same systems as unlimited postpay customers.

The superior performance resulting from use of existing near real-time billing systems is obtained by using a series of cellular network elements (i.e., the governor platform 35 and/or the associated MTSO 24) to estimate local and roaming usage of cellular service in real-time. In addition, the same cellular network elements will shut down the customer's service in real-time when they reach their spending limit, including mid-call teardown. Although the customer usage is measured and governed by the cellular network elements, the customer's bill is still generated using existing postpay billing systems, utilizing the existing business processes to provision, bill, and service the customer. The actual billed amounts may vary somewhat from the estimates used by the platform 35, when actual data is later accumulated and processed to generate the bill. The limit imposed by the platform 35 based on the estimated charges, however, limits the exposure of the carrier to bad debt and limits the impact on the customer of unexpectedly high charges, to within some tolerable percentage error in relation to the actual costs.

Figure 2:
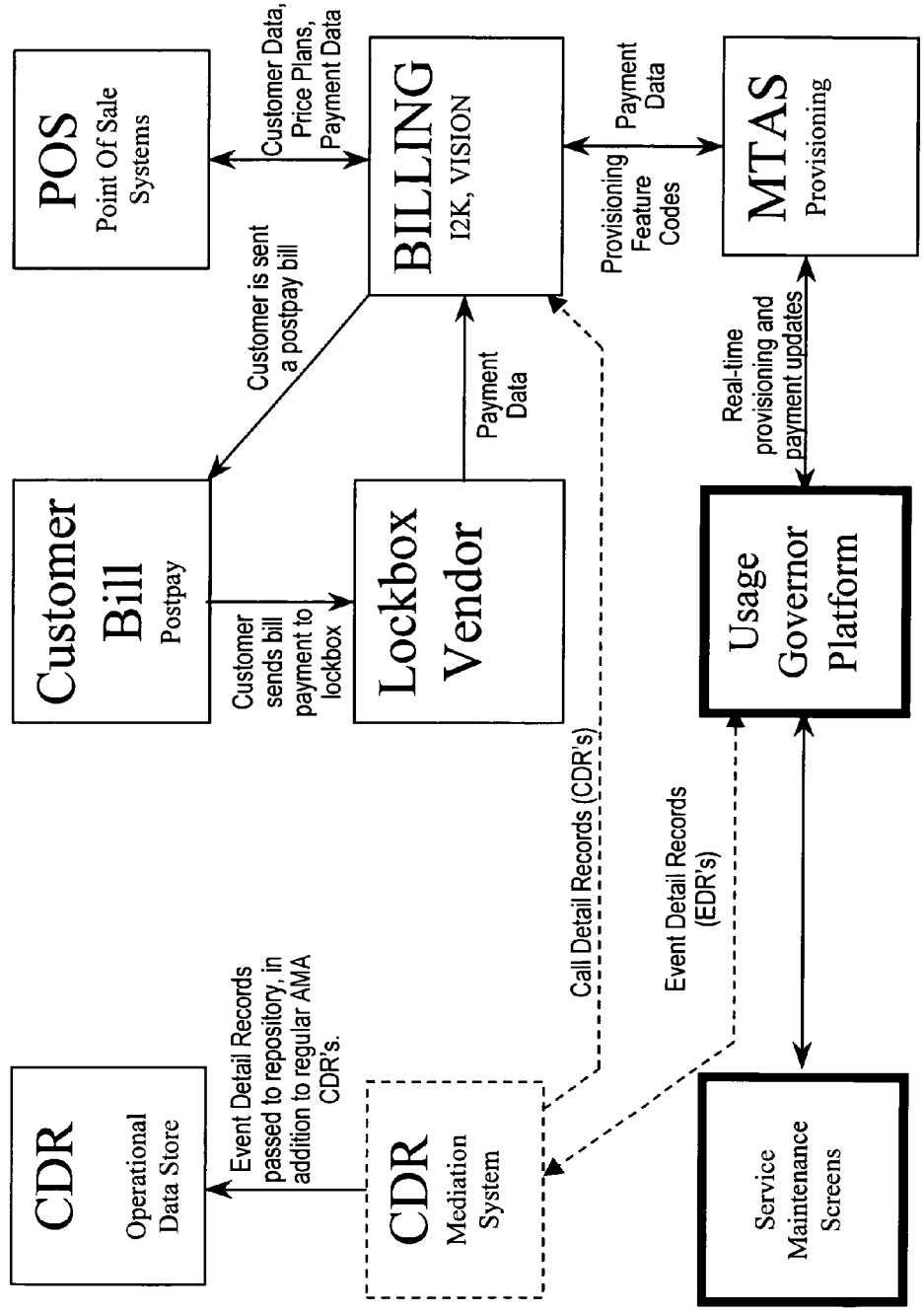
FIG. 2 is a block diagram of exemplary information technology (IT) systems of a wireless carrier, that may be used to support the spending limit type postpay service for mobile wireless communication customers.

The wireless carrier can utilize existing provisioning and billing systems to support the spending-limit type postpay services. The mobile wireless carrier normally operates a number of different administrative information technology (IT) systems in one or more customer service centers. FIG. 2 is a block diagram illustrating a set of IT systems that may be used to support the service. The IT systems include one or more billing systems, network provisioning systems such as the Mobile Telephone Administration system or "MTAS", client account administration systems, and the like.

The billing system, for example, receives usage and operations data from the MTSO switches and other network elements and processes that data to generate bills for individual customers. The accumulated data normally takes the form of call detail records (CDRs) for individual calls, accumulated and parsed from the individual event records, e.g. as produced by AMA processing. The CDRs which may be processed through a mediation system, stored in a repository (operational data store) and supplied to the billing system. The usage governor platform will also provide event detail records (EDRs) to the mediation system for similar processing, storage and forwarding to the billing system.

The MTAS provides provisioning data to provision services for new stations 23 and modifies provisioning data as customers change there subscriptions to obtain different sets of services from the carrier. This provisioning data would include data identifying the subscriber's services as limited postpay services. The provisioning system supplies the data to appropriate nodes of the wireless communication network 13, such as a home location register (HLR) which may reside in the MTSO switch or more likely in the SCP 15. The MTAS also sets the trigger(s), for the services to and from the subscriber's station, in the switch within the MTSO 25.

For purposes of the spending limited postpay services, the MTAS provisioning system also receives certain information regarding customer accounts from the carrier's billing system. Initially, the MTAS receives an agreed spending limit for a new customer account, for example based on an initial security deposit. The MTS provisions the database 37 associated with the governor platform 35 with the limit amount threshold for the new account. The billing system also will notify the MTAS, and the MTAS will provide updates to the database 37, in response to bill payments by the subscriber, to allow the database to increase or reset the customer's limit appropriately.

Those skilled in the art will recognize that the concepts disclosed herein have wide applicability and may admit of a wide range of modifications. For example, a technique such as outlined above could be implemented for serving "disposable phones," in rental car scenarios, for limited trials or try-before-you-buy service offerings, corporate sponsorship events, for resellers, and for other spending limit scenarios that may arise in mobile communications services. In each case, the customer account is provisioned with a spending limit on the usage governor platform and the responsible party or agent is sent a bill after usage, through the postpay billing systems. As another example, the limited postpay technique could be applied to other fields, where a customer is billed using asynchronous billing methods, but the usage of their service is measured synchronously.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. A method of limiting accumulation of usage billing charges associated with a one-rate postpay service through a wireless communication network in real time, comprising:

establishing a spending limit for a subscriber to a one-rate postpay service plan for providing service at one-rate within a geographic area, for a communication service offered through the wireless communication network;

detecting a call for communication through the wireless communication network for a wireless remote terminal station of the subscriber;

estimating a charge for completion of the call in accord with the one-rate service plan;

comparing the estimated charge to the established spending limit for the subscriber;

if the established spending limit is not as large as the estimated charge, preventing completion of the call through the wireless communication network;

if the established spending limit is at least as large as the estimated charge, calculating a maximum allowable duration for the call in accord with the one-rate service plan and the established spending limit, and completing the call through the wireless communication network;

monitoring length of the completed call in real time while the completed call is ongoing and interrupting the ongoing call through the wireless network if the length of the call reaches the calculated maximum allowable duration;

upon ending of the call through the wireless communication network, recording actual usage data regarding the call;

processing the recorded usage data in accord with the one-rate postpay service plan, to generate a bill for the subscriber; and sending the bill to the subscriber for payment.

2. The method of claim 1, wherein the communication service through the wireless communication network relates to voice telephone service, and the call is a voice telephone call through the wireless communication network.

3. The method of claim 1, wherein the estimated charge for completion of the call includes an estimate of an air time charge for use of the wireless communication network in accord with the one-rate postpay service plan.

4. The method of claim 1, further comprising deducting an amount of money corresponding to the recorded usage data from the established spending limit to establish an updated value for the spending limit for the wireless communication service subscriber.

5. A method of limiting accumulation of usage billing charges associated with a one-rate postpay service through a wireless communication network in real time, comprising:

establishing a spending limit for a subscriber to a one-rate postpay service plan for providing service at one-rate within a geographic area, for a communication service through the wireless communication network;

detecting a request for the communication service through the wireless communication network for a wireless remote terminal station of the subscriber;

estimating a charge for providing the requested communication service for the wireless remote terminal station in accord with the one-rate postpay service plan;

comparing the estimated charge to the established spending limit for the subscriber;

if the established spending limit is not as large as the estimated charge, denying the wireless remote terminal station from receiving the communication service through the wireless communication network;

if the established spending limit is at least as large as the estimated charge, calculating a maximum limit for the requested communication service, based on the one-rate postpay service plan and the established spending limit, and establishing a link through the wireless communication network with the wireless remote terminal station for the requested communication service;

monitoring extent of ongoing usage of the established link in real time and interrupting ongoing communication over the established link through the wireless communication network if the usage reaches the calculated maximum limit;

upon ending of communication through the established link, recording actual data regarding the monitored usage of the established link;

deducting an amount of money corresponding to the recorded usage data from the established spending limit to establish an updated value for the spending limit for the subscriber;

processing the recorded usage data in accord with the one-rate postpay service plan, to generate a bill for the subscriber; and sending the bill to the subscriber for payment.

6. The method as in claim 5, wherein the requested communication service comprises a voice telephone call, and the maximum limit is a maximum allowable duration for the voice telephone call.

7. The method as in claim 5, wherein the wireless communication network comprises a cellular telephone network.

8. The method as in claim 5, wherein the requested communication service comprises a data communication session.

9. A method of limiting accumulation of usage billing charges associated with a packet data communication service provided by a wireless communication network in real time, comprising:

establishing a spending limit for a subscriber to a postpay service plan for a packet data communication service offered by the wireless communication network;

detecting a request that the wireless communication network provide the packet data communication service to a wireless remote terminal station of the subscriber;

estimating a charge for providing the requested packet data communication service through the wireless communication network for the wireless remote terminal station;

comparing the estimated charge to the established spending limit for the subscriber;

if the established spending limit is at least as large as the estimated charge, calculating a maximum limit for the requested packet data communication service, based on the postpay service plan and the established spending limit, and establishing a packet data communication link through the wireless communication network with the wireless remote terminal station for the requested packet data communication service;

monitoring extent of ongoing usage of the established packet data communication link in real time, and interrupting ongoing packet data communication over the established link through the wireless communication network, if the usage reaches the calculated maximum limit;

upon ending of communication through the established packet data communication link, recording actual data regarding the monitored usage of the established packet data communication link;

processing the recorded usage data in accord with the postpay service plan, to generate a bill for the subscriber; and sending the bill to the subscriber for payment.

10. The method of claim 9, further comprising deducting an amount of money corresponding to the recorded usage data from the established spending limit to establish an updated value for the spending limit for the subscriber.

11. The method of claim 9, wherein if the established spending limit is not as large as the estimated charge, the method further comprises denying the request for packet data communication service.

* * * * *